United States Patent
Yen

(10) Patent No.: US 12,200,063 B2
(45) Date of Patent: *Jan. 14, 2025

(54) CLOUD-BASED ROADWAY EQUIPMENT MANAGEMENT PLATFORM

(71) Applicant: HUNG MING INFORMATION CO., LTD., Taichung (TW)

(72) Inventor: Chia Chun Yen, Taichung (TW)

(73) Assignee: Hung Ming Information Co., Ltd., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,523

(22) Filed: Sep. 27, 2023

(65) Prior Publication Data

US 2024/0348687 A1  Oct. 17, 2024

(30) Foreign Application Priority Data

Apr. 14, 2023  (TW) ................................. 112114116

(51) Int. Cl.
 *H04L 67/12* (2022.01)
 *H04L 67/5651* (2022.01)
 *H04L 69/04* (2022.01)

(52) U.S. Cl.
 CPC .......... *H04L 67/12* (2013.01); *H04L 67/5651* (2022.05); *H04L 69/04* (2013.01)

(58) Field of Classification Search
 CPC ...... H04L 67/12; H04L 67/5651; H04L 69/04
 See application file for complete search history.

(56) References Cited

U.S. PATENT DOCUMENTS

| | | | | |
|---|---|---|---|---|
| 9,371,099 | B2* | 6/2016 | Lagassey | B62D 41/00 |
| 11,689,697 | B2* | 6/2023 | Zhang | G06V 20/52 |
| | | | | 348/149 |
| 2002/0150050 | A1* | 10/2002 | Nathanson | H04L 41/12 |
| | | | | 370/254 |
| 2009/0201380 | A1* | 8/2009 | Peaslee | H04N 19/51 |
| | | | | 348/208.4 |
| 2018/0218596 | A1* | 8/2018 | Castelli | H04L 67/52 |
| 2019/0096238 | A1* | 3/2019 | Ran | G08G 1/164 |
| 2020/0005633 | A1* | 1/2020 | Jin | G06F 21/6254 |

(Continued)

FOREIGN PATENT DOCUMENTS

WO  WO-0079727 A2 * 12/2000  ............. G07C 5/008

*Primary Examiner* — Philip C Lee
(74) *Attorney, Agent, or Firm* — Rosenberg, Klein & Lee

(57) ABSTRACT

The present invention relates to a cloud-based roadway equipment management platform that mainly provides return data of roadway equipment for all roadway equipment, such as vehicle detector (VD), changeable message sign (CMS), automatic vehicle identification (AVI), traffic signal controller (TC), closed circuit television (CCTV) monitor, electronic tag (e-Tag) and more, within a specific area through a plurality of router monitoring data device installed in the equipment side as the communication equipment; receives and records return data of roadway equipment by a management platform that is cloud-based and composed of a plurality of servers with a user interface. The present invention can monitor, record, and inquire the roadway equipment, enhance the availability of devices, and help the traffic control center side on monitoring and managing equipment vendors, including clarifying responsibility thereof.

7 Claims, 13 Drawing Sheets

(56) References Cited

U.S. PATENT DOCUMENTS

| | | | |
|---|---|---|---|
| 2020/0239031 A1* | 7/2020 | Ran | G08G 1/0116 |
| 2020/0242922 A1* | 7/2020 | Dulberg | G01S 5/06 |
| 2023/0136925 A1* | 5/2023 | Pu | G08G 1/0133 |
| | | | 701/117 |

* cited by examiner

| Manage |
|---|

☐ Home Page ☐ Account Permission Management ☐ Abnormal Data Characteristics Management ☐ Data Inquiry ☐ Emergency Notification ☐ Log Out

| VD ▽ | Provincial Highway 65 ▽ |
|---|---|
| New Equipment | |

Abnormal Equipment

Location:Provincial Highway 65 2k+75
No. VD-12-650
IP:10.11.111.9:1011
PORT:80
Latitude and Longitude:121.44234 25.04822

| Reboot Equipment |
|---|

Equipment State:
abnormal communication (router line disconnection)
abnormal equipment (abnormal VD value)
abnormal equipment (detection value too small)

CMS Abnormal Content Keyword Management

☐ Home Page ☐ Account Permission Management ☐ Abnormal Data Characteristics Management ☐ Data Inquiry ☐ Emergency Notification ☐ Log Out CMS abnormal content keyword management + New   ◫ Save   × Cancel   ⊠      <   >   ↻ Refresh

| Parameter | Abnormal Content Keyword |
|---|---|
| CMS | unusual vulgar words |

◫ Save   × Cancel                    <   >   ↻ Refresh

| ⏱ latest update records | x |
|---|---|
| Time | Update Summary |
| no update recently | |

VD, CMS, eTag, AVI, TC No-active Returning Threshold Value Management

☐ Home Page  ☐ Account Permission Management  ☐ Abnormal Data Characteristics Management  ☐ Data Inquiry  ☐ Emergency Notification  ☐ Log Out VD, CMS, eTag, AVI, TC no-active returning threshold value management + New   🖫 Save   ✕ Cancel   [x]   <   >   ↻ Refresh

| Parameter | Active Returning Threshold Value (second) |
|---|---|
| VD | 300 |
| CMS | 600 |
| eTag | 1800 |
| AVI | 600 |
| TC | 3000 |

🕒 latest update records   x

| Time | Update Summary |
|---|---|
| no update recently ||

🖫 Save   ✕ Cancel   <   >   ↻ Refresh

--- eTag AVI Time-period Detectable Threshold Management

☐ Home Page  ☐ Account Permission Management  ☐ Abnormal Data Characteristics Management  ☐ Data Inquiry  ☐ Emergency Notification  ☐ Log Out eTag AVI time-period detectable threshold management + New   🖫 Save   ✕ Cancel   [x]   <   >   ↻ Refresh

| Parameter | Time-period | Detectable Value |
|---|---|---|
| eTag | 00:00 ~ 12:00 | 1000 |
| AVI | 12:00 ~ 23:59 | 500 |

🕒 latest update records   x

| Time | Update Summary |
|---|---|
| no update recently ||

🖫 Save   ✕ Cancel   <   >   ↻ Refresh

Whitelist Management

☐ Home Page  ☐ Account Permission Management  ☐ Abnormal Data Characteristics Management  ☐ Data Inquiry  ☐ Emergency Notification  ☐ Log Out whitelist management \+ New   🖫 Save   × Cancel   🗙▤                               <   >   ↻ Refresh

| Parameter | IP | Equipment PORT | MAC |
|---|---|---|---|
| CMS | 192.168.0.1:5432 | 80 | 00:00:00:00:00 |
| CMS | 127.0.0.1:2432 | 8080 | 00:12:23:21:00 |
| TC | 117.56.54.29:9833 | 80 | 47:12:12:22:10 |

🕒 latest update records   x

| Time | Update Summary |
|---|---|
| no update recently ||

🖫 Save   × Cancel                               <   >   ↻ Refresh

Equipment Data Inquiry Emergency Notification

☐ Home Page  ☐ Account Permission Management  ☐ Abnormal Data Characteristics Management  ☐ Data Inquiry  ☐ Emergency Notification  ☐ Log Out Equipment Type: [VD ▾]   Equipment ID: [ ▾]   Inquiry Date: [2022/11/20] 📅 to [2023/01/20] 📅 🗙▤

\+ New   🖫 Save   × Cancel                               <   >   ↻ Refresh

| Time | Equipment ID | Data |
|---|---|---|
| 2022-10-10 00:00:10 | eTag-31-0280-028-01 | {"id":"eTag-31-0280-01":[{"datetime":"2022-10-1000:06:56","VehicleId":"105013AA3213459D46455443"}]} |
| 2022-10-10 00:00:50 | CMS-37-0260-093-01 | {"cmsNo":CMS-37-0260-093-01"."status":200,"full Text":[{"test":"Vehicles carrying dangerous goods or oversized goods are prohibited from passing through the unnel.","color":"","textid":""}],"displayTime":""} |

🕒 latest update records   x

| Time | Update Summary |
|---|---|
| no update recently ||

🖫 Save   × Cancel                               <   >   ↻ Refresh

Emergency Notification Management (Input Emergency Notification)

☐ Home Page ☐ Account Permission Management ☐ Abnormal Data Characteristics Management ☐ Data Inquiry ☐ Emergency Notification ☐ Log Out

| Equipment Type: | VD ▽ | Fuzzy Search | Equipment: | all items chechked ▽ | Input Emergency Notification Contents: | | Input | latest update records  x

| Time | Update Summary |
|---|---|
| no update recently | |

Equipment IP Blackout/Reboot – Issue Blackout/Reboot Command

☐ Home Page ☐ Account Permission Management ☐ Abnormal Data Characteristics Management ☐ Data Inquiry ☐ Emergency Notification ☐ Log Out

| Issue Blackout/Reboot Command | Inquire Blackout Records |
|---|---|

| Equipment Type: | ▽ | Roadway Name: | Provincial Highway 61 ▽ | Equipment ID: | VD-12-0610-000-001 ▽ | Issue |

Equip IP blackout/reboot

< >  ↻ Refresh

| Equipment ID | Equip IPC Blackout/Reboot |
|---|---|
| VD-12-0610-000-001 | blackout/reboot |
| eTag-11-1100-025-001 | blackout/reboot |
| CMS-12-0650-001-001 | blackout/reboot | latest update records  x

| Time | Update Summary |
|---|---|
| no update recently | |

CLOUD-BASED ROADWAY EQUIPMENT MANAGEMENT PLATFORM

FIELDS OF THE INVENTION

The present invention relates to the domain of roadway equipment management, especially the technical scope of a cloud-based roadway equipment management platform.

DESCRIPTIONS OF RELATED ART

Generally, roadways are equipped with a few devices and equipment, including vehicle detectors (VD), changeable message sign (CMS), automatic vehicle identification (AVI), traffic signal controllers (TC), closed circuit television (CCTV) monitors, detectors of the electronic tag (eTag) of an electronic toll collection system,
  wherein the VD collects data of traffic flows; the CMS posts messages through the communication transport network in order to provide road condition information, traffic propaganda or relevant messages to road users; the AVI identifies and records the time and license plate of each vehicle that passes by the detection point; the TC equipment controls the operation of red, yellow, green traffic lights at the intersection; the eTag detector is used to read data from electronic tags.

As shown in FIG. 18, a roadway equipment 9 currently can control or return data of the traffic and road conditions, detected by the roadway equipment 9 at the site, back to the traffic control center side 7 through a communication network equipment (for example, modem 8) controlled by the traffic control center side 7, which is constructed by the government public sectors. The transmission pathway is to first deliver the return traffic data, collected by the roadway equipment 9, to the virtual private network of government service networks (GSN VPN), established by internet service providers (ISP), then to the traffic control center side 7 through wired network or wireless network methods and using ADSL or a modem 8; the last step is to transmit the return data to the traffic control center side 7.

However, the roadway equipment 9 are lack of information security management and can easily become a hacking target. Unused network ports can be a channel easily attacked by hackers. For example, after being infected by viruses, a system of traffic control center side 7 stops functioning partially or entirely, or text contents of CMS equipment is altered. Therefore, the existing transmission methods of the roadway equipment 9 for returning traffic data to the control center side need to be improved.

Furthermore, due to the hot and humid summer weather, the roadway equipment 9 are easily overheated and experience system crash; the mechanic components deteriorate faster than those installed indoor, resulting in challenges in and test of the availability of the roadway equipment 9. According to the author's 1133 data records of maintenance logs on power blackout and reboots during the year of 2022, 726 records show that the systems returned to a normal operation after blackout/reboot. The aforementioned device of blackout/reboot is located in the equipment side, the maintenance personnel must arrive at the site in person in order to carry out the blackout/reboot action which consumes maintenance manpower significantly.

Furthermore, the traffic control center sides 7 constructed by government public sectors currently are unable to identify the condition of the roadway equipment 9 of the equipment side in time in order to notify and dispatch relevant responsible vendors to maintain the problematic equipment. As a result, the availability of the roadway equipment 9 of the equipment side cannot be improved.

SUMMARY OF THE INVENTION

In view of the aforementioned problems in maintenance and management of the existing roadway equipment, authors of the present invention invent a cloud-based roadway equipment management platform. The main objective of the present invention is to provide a cloud-based roadway equipment management platform that has a user interface of both the visual effect and easy-to-use features, in order to monitor and manage devices of the equipment side. The secondary objective of the present invention is to provide a cloud-based roadway equipment management platform to improve the availability and maintenance efficiency of the device of the equipment side. One additional objective of the present invention is to provide a cloud-based roadway equipment management platform for the traffic control center side to identify responsibilities of the equipment vendors.

In order to achieve the aforementioned objectives, the following technical mean can be applied that uses a cloud-based roadway equipment management platform, which is used together with a plurality of router monitoring data devices, comprising a communication server, a logical server, and a web server that use a custom-made communication protocol to maintain networking among servers, wherein the plurality of router monitoring data devices provide network connection for the roadway equipment of the equipment side through wired network or wireless network and return data of the roadway equipment back to the traffic control center side based on contents of the safety checklist of the built-in electronic device identification and network address; a communication server comprises a communication receiving program in order to receive return data of the roadway equipment transmitted by the plurality of router monitoring data devices and then compress those return data prior to being transmitted to a logical server; the logical server uncompresses the compressed packets transmitted by the communication server and further comprises a data analysis program that analyzes the uncompressed packets and transmits the analysis results to a database server for storage; and the web server comprises, but not limited to, a user interface (UI) for accessing information stored in the database server and provides functions for issuing commands to the plurality of router monitoring data devices, wherein the function main tags of the user interface include "home page", "account permission management", "abnormal data characteristics management", "data inquiry", or/and "emergency notification".

Each of the plurality of router monitoring data devices further comprises a communication module, a receiver module, a whitelist database, a control module, and a judgment module. The control module is electrically connected with the judgment module and is further connected to a relay outside the device in order to provide the function of initiating blackout/reboot of the device of the equipment side,
  wherein the judgment module determines commands and conditions of abnormal communication of the equipment side that must be recorded; comparison is performed based on the safety checklist of electronic device identification and network address retrieved from the whitelist database; regardless whether a match is found or not, information of the operational actions of the roadway equipment is transmitted to a communication receiving program of the designated communication port;

wherein conditions of abnormal communication usually refer to line disconnection of the equipment side, line disconnection of routers, abnormal IP address addition, abnormal MAC address addition or/and abnormal communication port addition; the safety checklist of electronic device identification and network address is a list of communication ports and Mac addresses of IP addresses available for roadway equipment to plug in;

wherein the data analysis program installed in the logical server comprises a packet parsing unit and an intelligent analysis unit; the packet parsing unit uses regular expression technology to quickly compare the specification of a received packet; if such a specification matches the specification of the communication protocol, then the packet is disassembled to get data of roadway equipment and then the intelligent analysis unit analyzes data of the roadway equipment specifically; if such a specification does not match the specification of the communication protocol, it is determined as "off protocol-specification";

wherein the intelligent analysis unit determines whether the roadway equipment that generates data is a CMS equipment or not; if the data is from a CMS equipment, the intelligent analysis unit then will determine whether the text contents contain certain special keywords; if special keywords exist, it is determined as "off CMS-specification", an abnormal condition; if the intelligent analysis unit determines that the roadway equipment which generates data is not a CMS equipment, then the intelligent analysis unit will determine conditions of "abnormal equipment value", "detection value too small" and "no-active reporting" of the roadway equipment separately;

wherein a queue server, installed between the communication server and the logical server, receives the compressed packets transmitted by the communication server and sets those packets in queue based on timestamp to be processed by the logical server;

wherein the function sub-tags of "home page" include "instrument panel of availability" and "system login"; the function sub-tags of "data inquiry" include "equipment data inquiry", "equipment availability state inquiry" and "emergency notification record inquiry"; the function sub-tags of "emergency notification" include "emergency notification management" and "equipment IPC blackout/reboot";

wherein the function sub-tags of "abnormal data characteristics management" include "CMS abnormal content keyword management", "VD CMS eTag AVI TC no-active returning threshold value management", "eTag AVI time-period detectable threshold value management" and "whitelist management"; the function sub-tags of "data inquiry" include "roadway equipment data inquiry" "roadway equipment availability inquiry" and "emergency notification record inquiry"; and wherein the function sub-tags of "account permission management" include "account management", "role management", "permission management", and "function management" "operation record inquiry".

Therefore, the present invention adopts the aforementioned technical means to achieve the following effects:

1. The user interface of the web server of the present invention has both the visual and easy-to-use effects, allowing users to easily decode, inquire, record, notify, and manage various data returned by the roadway equipment located in the equipment side; at the same time, the aforementioned web server also provides functions for issuing commands to the plurality of router monitoring data device and updating the whitelist.

2. The present invention can monitor the return traffic data transmitted from the roadway equipment of the equipment side in order to determine whether communications of the equipment is abnormal or not, for example, "line disconnection of equipment side", "line disconnection of routers", "abnormal IP address addition", "abnormal MAC address addition" and "abnormal communication port addition", and also determine abnormal conditions of equipment, including "CMS inconsistency", "off CMS-specification", "detection value too small", "no-active reporting", and "off protocol-specification".

3. When the roadway equipment of the equipment side may be overheated and experience system crash, the present invention can issue commands of blackout/reboot remotely to the aforementioned device, in order to improve the availability of the roadway equipment.

4. When the present invention monitors and detects abnormal conditions of communication and equipment, the present invention can help the traffic control center side clarify responsibility of equipment vendors, notify and dispatch relevant vendors to maintain the problematic equipment in time. Therefore, safety, availability, and maintenance efficiency of roadway equipment are improved.

The present invention will become more fully understood from the detailed description given herein below for illustration only which thus does not limit the present invention, wherein:

BRIEF DESCRIPTION OF THE DRAWINGS

FIG. 10 is a schematic diagram of a pop-up display window appearing in the instrument panel of availability of the present invention.

FIG. 11 is a schematic diagram of a display window of CMS abnormal content keyword management of the present invention.

FIG. 12 is a schematic diagram of a display window of VD CMS eTag AVI TC no-active returning threshold value management of the present invention.

FIG. 13 is a schematic diagram of a display window of eTag AVI time-period detectable threshold value management of the present invention.

FIG. 14 is a schematic diagram of a display window of whitelist management of the present invention.

FIG. 15 is a schematic diagram of a display window of equipment data inquiry of the present invention.

FIG. 16 is a schematic diagram of a display window of emergency notification of the present invention.

FIG. 17 is a schematic diagram of a display window of equipment IPC blackout/reboot of the present invention.

DETAILED DESCRIPTION OF THE PREFERRED EMBODIMENT

Figure 1:
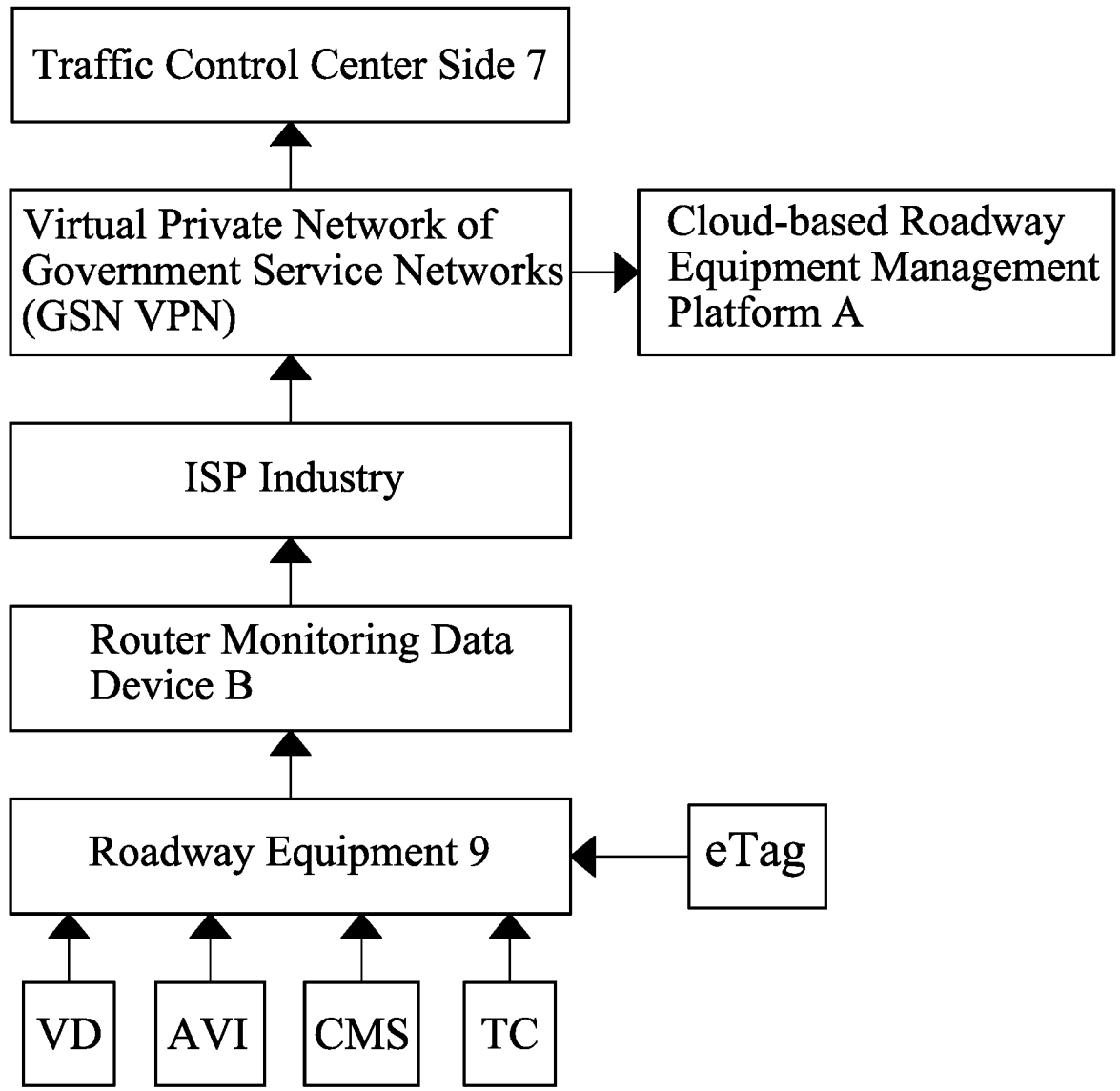
FIG. 1 is a schematic diagram of an embodiment of the cloud-based roadway equipment management platform of the present invention.
Figure 2:
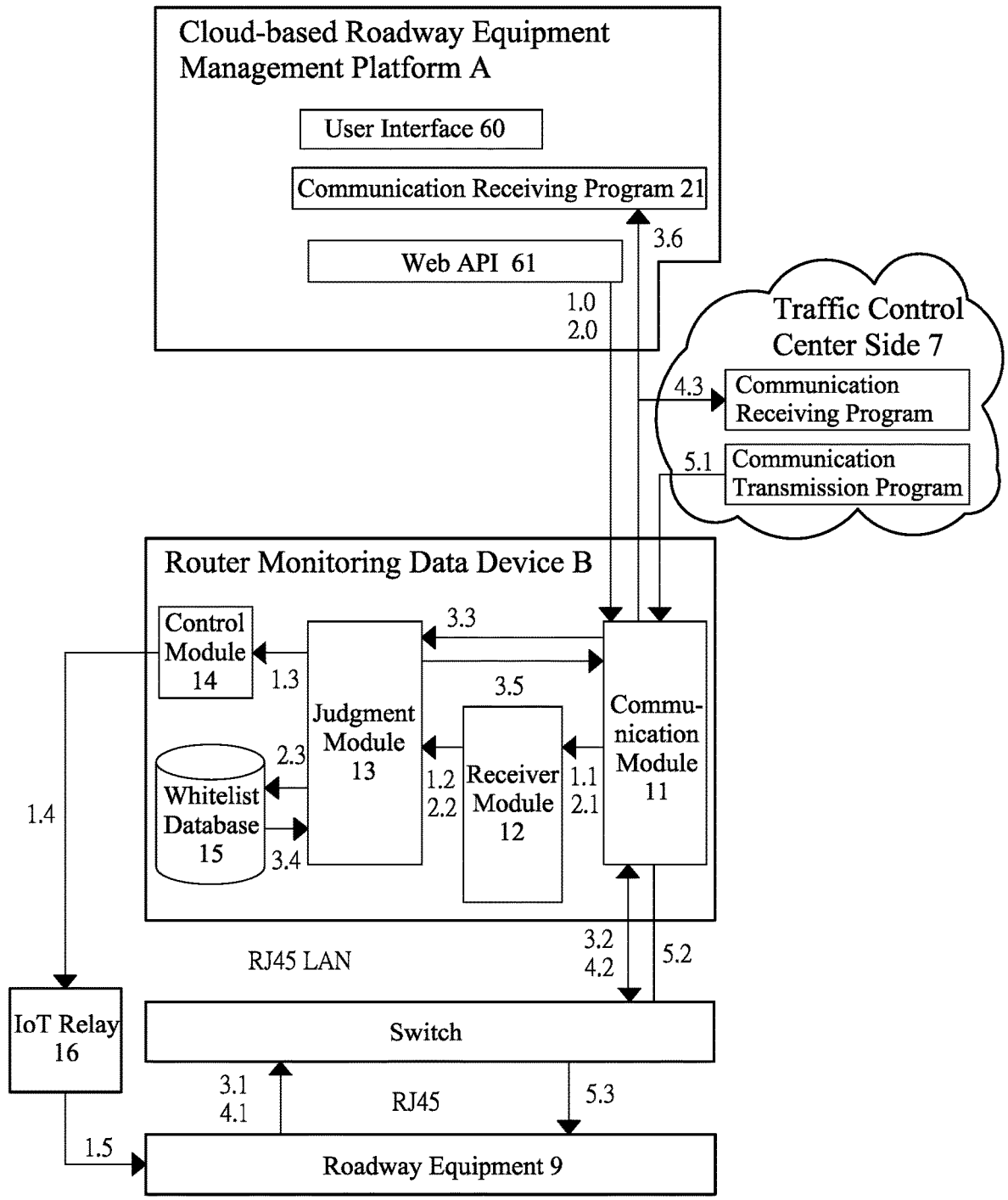
FIG. 2 is an architecture diagram of the router monitoring data device of the equipment side of the cloud-based roadway equipment management platform of the present invention.

Please refer to FIG. 1 and FIG. 2. The present invention relates to a cloud-based roadway equipment management platform A that mainly provides and constructs a plurality of servers to receive and record the return data transmitted from all roadway equipment, such as vehicle detector (VD), changeable message sign (CMS), automatic vehicle identification (AVI), traffic signal controller (TC), closed circuit television (CCTV) monitor, electronic tag (e-Tag) and more, within a specific area through a router monitoring data device B that replaces the existing internet-connected router-modem devices. The present invention can monitor, record, inquire devices of the roadway equipment 9, improve the availability of equipment, and help the traffic control center side 7 to clarify responsibility of equipment vendors.

Figure 18:
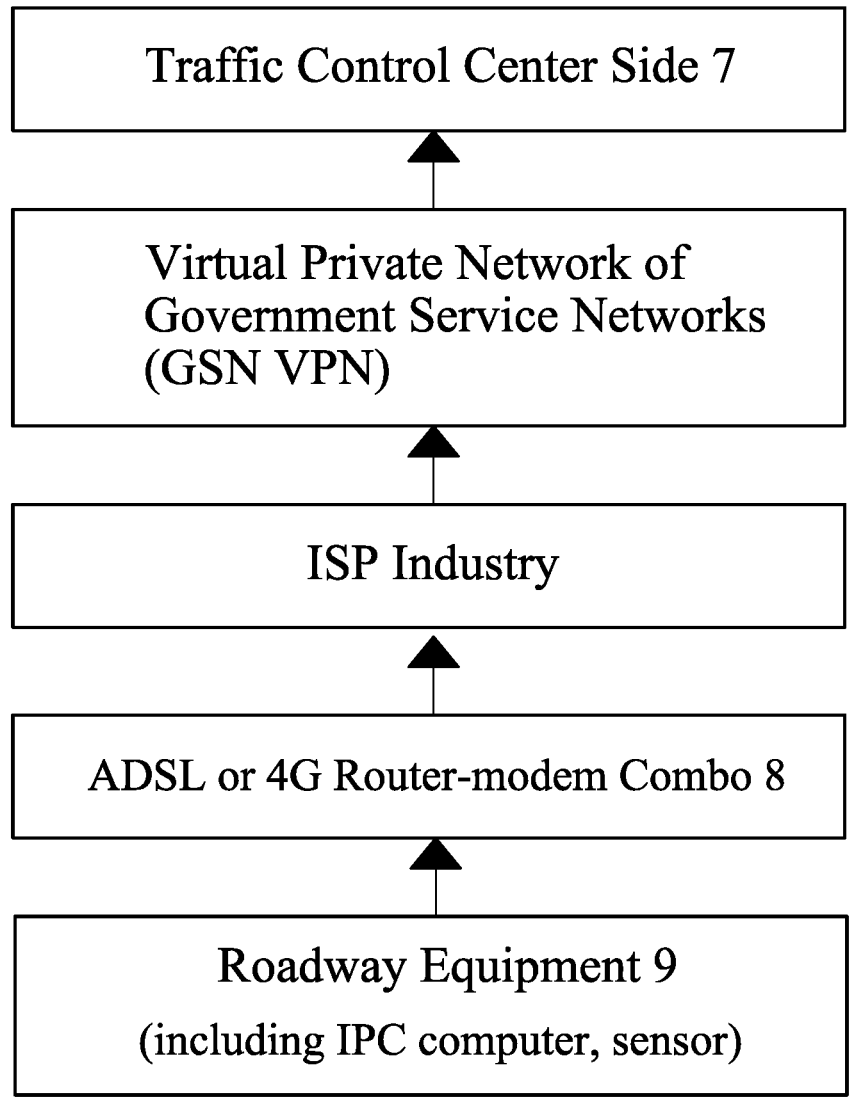
FIG. 18 is a schematic diagram of the internet-connected pathway for returning data of conventional roadway equipment.

First, the present invention must use a plurality of router monitoring data devices B to replace the existing conventional internet-connected devices of roadway equipment 9. Usually, all roadway equipment within a specific area use two types of internet-connected equipment, ADSL modems 81 and 4G router-modem combos 8, as shown in FIG. 18. Therefore, the present invention needs to replace such two types of internet-connected equipment with the plurality of router monitoring data devices B.

Figure 3:
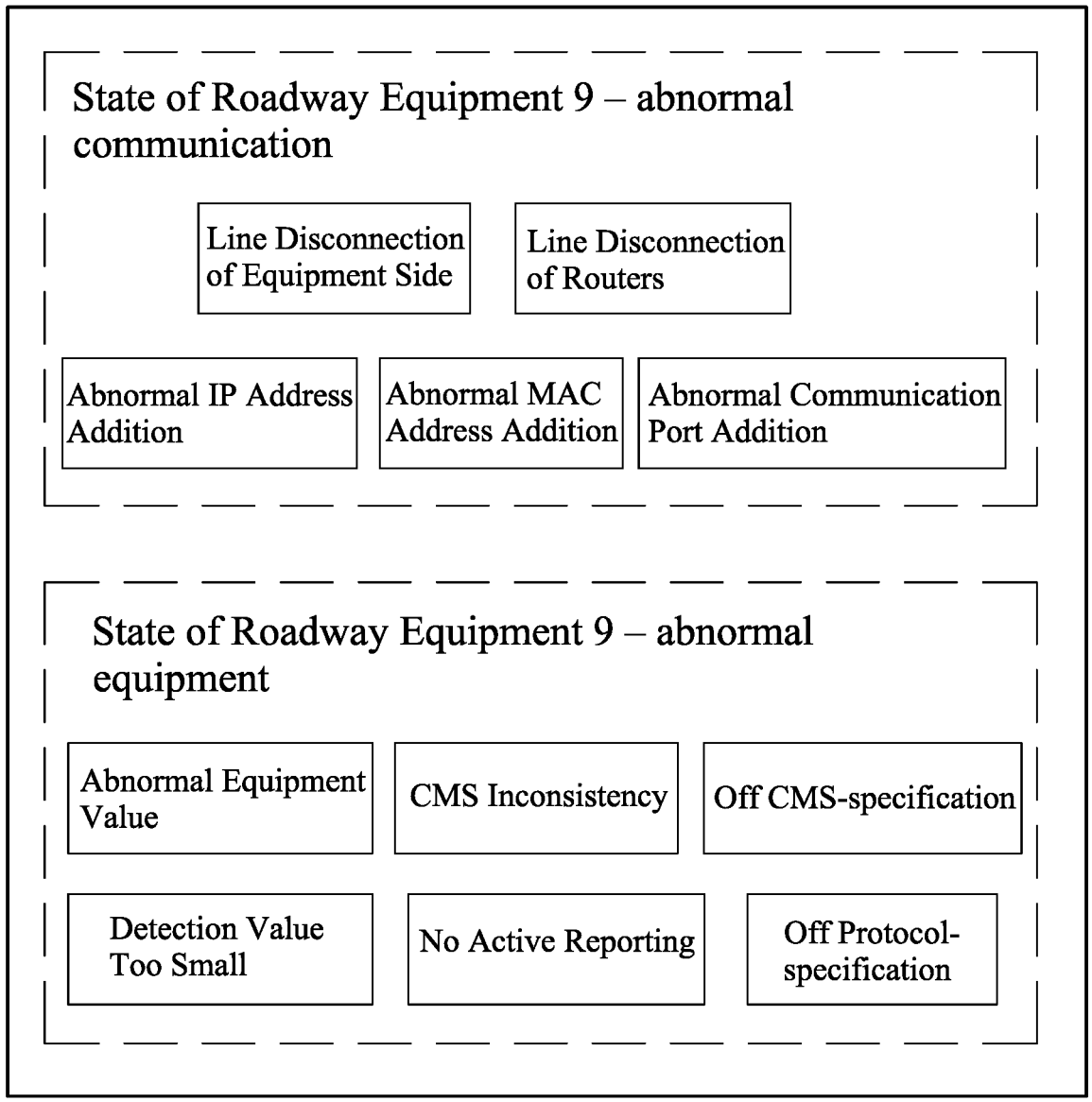
FIG. 3 is a schematic diagram of several forms of abnormal devices of the equipment side of the cloud-based roadway equipment management platform of the present invention.

The plurality of router monitoring data devices B have not only those command functions of the existing internet-connected equipment, including receiving and transmitting return traffic data from the equipment side to the traffic control center side 7, but also functions of monitoring and uploading state of the equipment and communication conditions of the roadway equipment 9 of the equipment side through the virtual private network of government service networks (GSN VPN) to the cloud-based roadway equipment management platform A of the present invention for further analysis, recording, inquiry, notification and management. The abnormal communication of the aforementioned monitoring equipment side, as shown in FIG. 3, refers to "line disconnection of equipment side", "line disconnection of routers", "abnormal IP address addition", "abnormal MAC address addition" or/and "abnormal communication port addition". The plurality of router monitoring data devices B can be further equipped with IoT relays 16, when it is applicable, in order to activate the blackout/reboot function by remotely controlling the roadway equipment 9 of the equipment side that forces the roadway equipment 9 back to a normal operation with high possibility.

Please refer to FIG. 2. The router monitoring data device B comprises a communication module 11, a receiver module 12, a judgment module 13, a control module 14, and a whitelist database 15. Descriptions of the aforementioned components are provided as follows.

The communication module 11 transmits and returns the traffic data and receives packets of commands, wherein when the roadway equipment 9 delivers the equipment information through wired network or wireless network methods, the communication module 11 will transmit such information to the judgment module 13.

The receiver module 12 is electrically connected with the communication module 11 and performs functions of receiving packets of web API 61 push commands of the cloud-based roadway equipment management platform A.

The judgment module 13, which is electrically connected with the receiver module 12, provides functions of analyzing packets of the return traffic data transmitted by the roadway equipment 9 and determining command packets, wherein the judgment module 13 issues commands that determine whether the return information sent from the roadway equipment 9 shall be recorded and whether such information conforms an abnormal communication of the equipment side. If the condition is determined as an abnormal communication, the condition shall be checked by matching with a safety checklist of electronic device identification and network address (commonly known as the "whitelist" in the industry; hereinafter referred to as "the whitelist") retrieved from the whitelist database 15. Regardless whether a match is found or not, information of the operational actions of the roadway equipment 9 is transmitted by the communication module 11 to a communication receiving program 21 of the cloud-based roadway equipment management platform A at the designated communication port; only fixed IP packet headers are transmitted to prevent the communication in the equipment side from overload. In general, the aforementioned electronic devices listed in the safety checklist of electronic device identification and network address refer to single chips, IPC computers, tablet computers, notebook computers, desktop computers.

The control module 14, which is electrically connected with the judgment module 13, is further connected to an IoT relay 16 outside the device so that the control module 14 is able to actuate the IoT relay 16.

The whitelist database 15, which is electrically connected with the judgment module 13, has the function of storing the whitelists, wherein the whitelist database is updated on a daily basis; the whitelist can provide the communication ports and Mac addresses of IP addresses available to be used by roadway equipment 9 to transmit the return traffic data.

Figure 4:
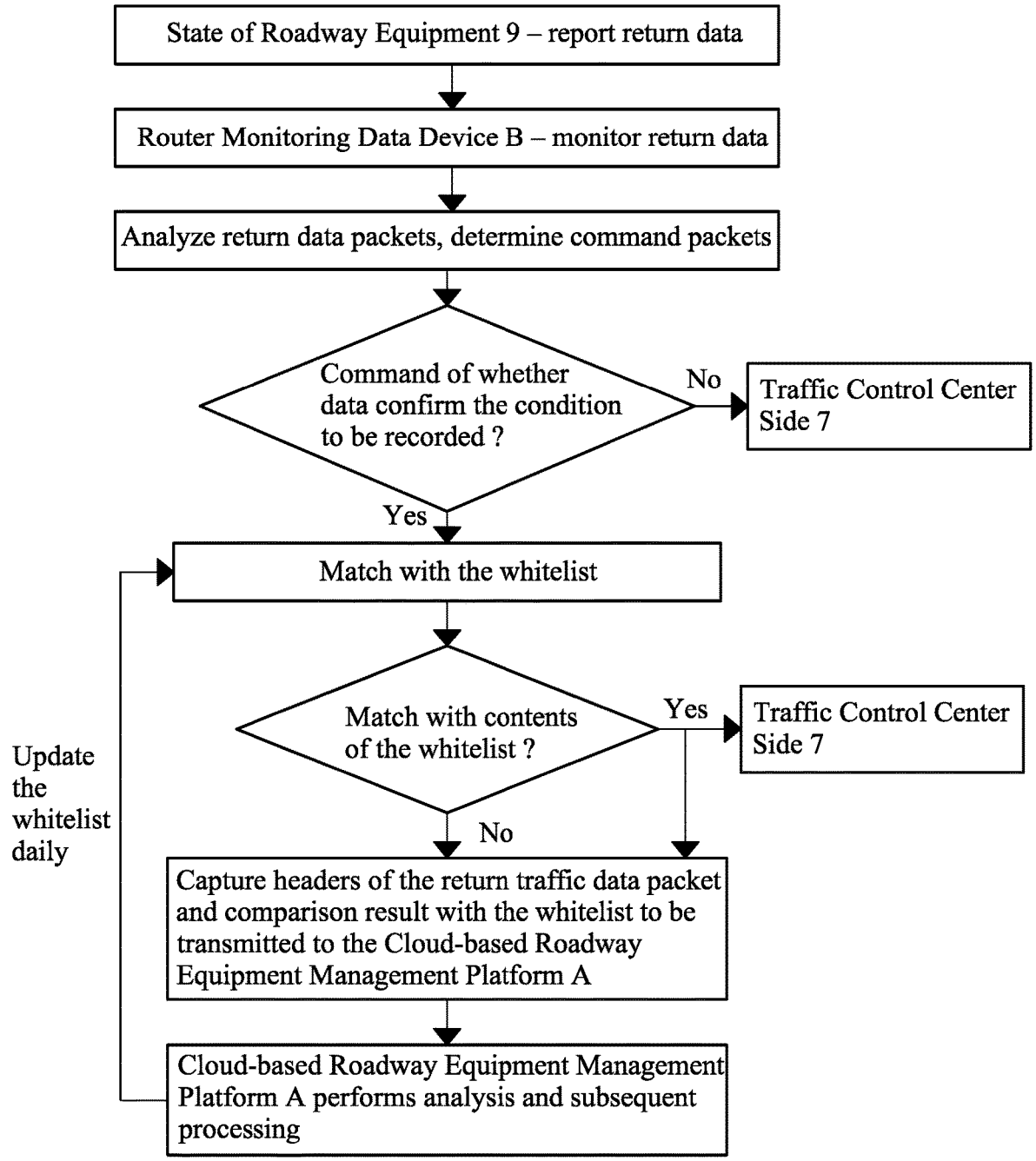
FIG. 4 is a flow chart of the front end operation to monitor return traffic data transmitted from the equipment side of the cloud-based roadway equipment management platform of the present invention.

Therefore, the router monitoring data device B mainly provides optimal solutions for roadway equipment 9 to transmit return traffic data of communication equipment, as shown in FIG. 4. When a roadway equipment 9 transmits return traffic data, the router monitoring data device B will monitor such data, analyze packets of the return traffic data and command packets transmitted by the roadway equipment 9. If the packet of the return traffic data needs to be recorded, the judgment module 13 will retrieve the whitelist from the whitelist database 15 to process matching. Regardless whether a match is found within the whitelist or not, the header of the return traffic data packet and comparison result with the whitelist will be captured, together with information of the operational actions of the roadway equipment 9, to be transmitted by the communication module 11 to a communication receiving program 21 of the cloud-based roadway equipment management platform A of the present invention at the designated communication port, so that the cloud-based roadway equipment management platform A can perform analysis and subsequent processing. For instance, if no match in IP or MAC PORT of the whitelist is detected, there is a high possibility that the system is under attack by hackers. On the other hand, if the packet of return traffic data does not need to be recorded and has a match in the whitelist, the return traffic data of the roadway equipment 9 will be transmitted directly to the traffic control center side 7 by the communication module 11.

When the router monitoring data device B executes the blackout/reboot operation on the roadway equipment, the implementation pathway is from steps 1.0 to 1.5, having [1.0: aperiodic push command]→[1.1: accepting push command from Web API 61]→[1.2: analyzing packet; judging command]→[1.3: blackout/reboot command]→[1.4: enabling IoT relay 16]→[1.5: rebooting roadway equipment 9 after blackout]. The aforementioned implementation pathway can reboot the roadway equipment 9 remotely.

When the router monitoring data device B is updating the whitelist, the implementation pathway is from steps 2.0 to 2.3, having [2.0: daily update]→[2.1: accepting push command from Web API 61]→[2.2: analyzing packet; judging command]→[2.3: updating IP communication port and MAC address of the whitelist]. This implementation pathway can update the whitelist of the whitelist database 15 daily.

When the router monitoring data device B is transmitting return data of the equipment side and detects an abnormal communication condition, the implementation pathway is from steps 3.1 to 3.6, having [3.1: reporting from equipment on equipment information (VD: traffic volume and velocity; CMS: changeable Message currently displayed . . . )]→[3.2: data flowing from switch to router]→[3.3: command of judging whether message shall be recorded, and whether message conforms conditions of abnormal communication, including line disconnection of equipment side, line disconnection of routers, abnormal IP address addition, abnormal MAC address addition, and abnormal communication port addition]→[3.4: Retrieving whitelist for matching]→[3.5: regardless whether a match is found in whitelist, operational actions of equipment is transmitted through communication module 11]→[3.6: message received by communication receiving program 21 of designated communication port]. The improved router data device 1 will transmit a message of the abnormal condition to the management platform center side 6 in order to determine the state of the roadway equipment 9 and subsequent processing, such as blackout/reboot or maintenance dispatch. For one other example, when the improved router data device 1 is detecting whether it is an abnormal message, a PING command is usually issued to the roadway equipment 9 and the traffic control center side 7 in order to test whether line disconnection in communication exists. If an abnormal communication exists, then the improved router data device 1 will transmit this message to the management platform center side 6 for conducting subsequent maintenance.

When the router monitoring data device B is transmitting return data of the equipment side and does not detect an abnormal communication condition, the implementation pathway is from steps 4.1 to 4.3, having [4.1: reporting from equipment on equipment information (VD: traffic volume, velocity, and density; CMS: changeable Message currently displayed . . . )]→[4.2: data flowing from switch to router]→[4.3: data received by traffic control center side 7]. Normal and no unusual return data are transmitted directly to the traffic control center side 7.

When the router monitoring data device B is executing commands issued by the traffic control center side 7, the implementation pathway is from steps 5.1 to 5.3, having [5.1: traffic control center side 7 issuing commands]→[5.2: transmitting data]→[5.3: transmitting data to roadway equipment 9]. In this implementation pathway, the traffic control center side 7 obtains the control right from the roadway equipment 9. Taking traffic signals as an example, the SET command is to change the interval time (in second) of the red signal light at the time; the GET command is to get the time duration (in second) of the red signal light at the time.

Figure 5:
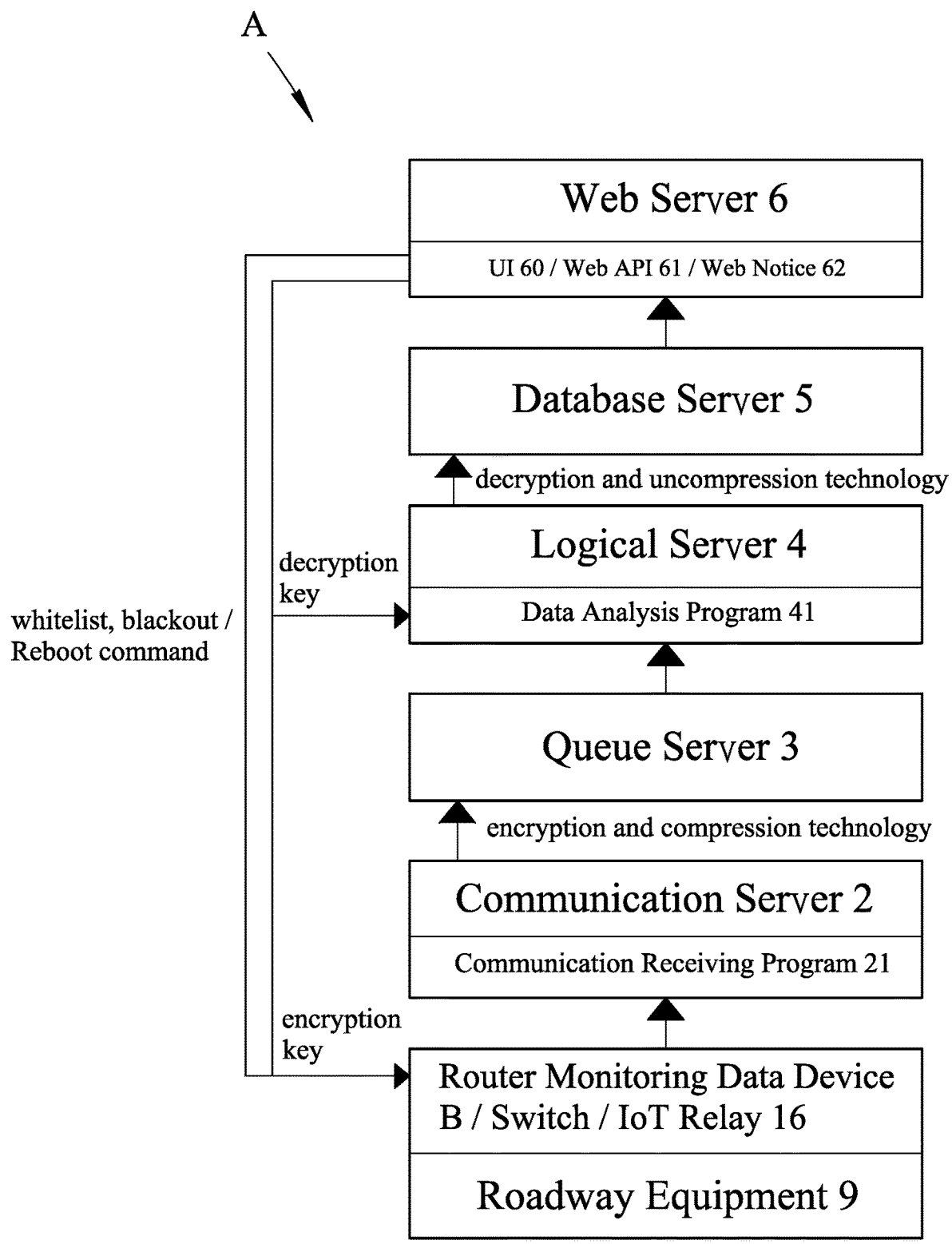
FIG. 5 is an overall architecture diagram of the cloud-based roadway equipment management platform of the present invention.
Figure 6:
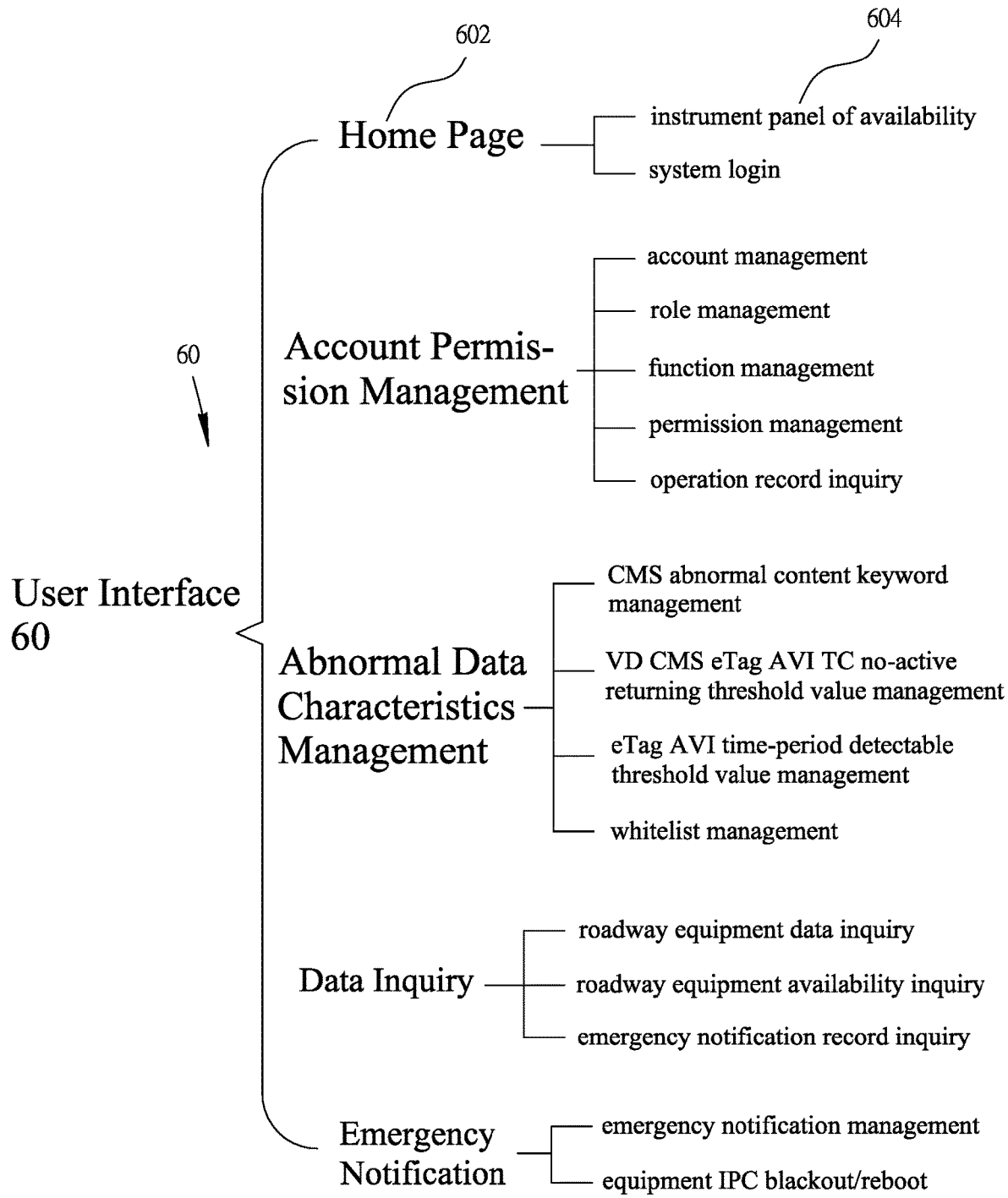
FIG. 6 is an architecture diagram of the user interface of the web server of the cloud-based roadway equipment management platform of the present invention.

The cloud-based roadway equipment management platform A of the present invention, in conjunction with the router monitoring data device B, receives, records, analyzes, monitors, notifies and manages return traffic data transmitted by the roadway equipment 9 of the equipment side, wherein the cloud-based roadway equipment management platform A, as shown in FIG. 5, comprises a communication server 2, a queue server 3, a logical server 4, a database server 5, and a web server 6 that use a custom-made communication protocol to maintain networking among servers. The aforementioned communication protocol is the "Third Edition of the Urban Area Traffic Control Communications Protocol" that defines fixed packet headers, verification code, packet bit definition, and also defines methods of the communication handshake, wherein the communication server 2 comprises a communication receiving program 21 in order to receive return data of the roadway equipment 9 transmitted by the plurality of router monitoring data devices B, and then compress those return data prior to being transmitted to a queue server 3. To compress the return data is to ease up the capacity and transmission volume of the queue server 3. When the queue server 3 and the communication server 2 are not in the same computer facility or when various services provided by the present invention need to be installed in different computer facilities, the return data transmitted by the roadway equipment 9 must be compressed and encrypted prior to being sent to the queue server 3;

the queue server 3 provides a reliable transmission service of asynchronous messages, significantly reduces decoupling applications, improves efficiency, and has good reliability and scalability. The queue server receives the compressed packets transmitted by the communication server 2 and sets those packets in queue based on time-stamp to be processed by the logical server 4;

the logical server 4 uncompresses the compressed packets transmitted by the queue server 3 and further comprises a data analysis program 41 that analyzes the uncompressed packets and transmits the analysis results to the database server 5 for storage. Furthermore, when the logical server 4 receives encrypted compressed packets, the encrypted compressed packet must be decrypted and uncompressed in sequential order before the analysis takes place; the analysis results are transmitted and stored in the database server 5 afterward; the data analysis program 41 comprises a packet parsing unit 411 and an intelligent analysis unit 412;

the web server 6 comprises a user interface 60 for accessing information stored in the database server 5 and, at the same time, provides functions for issuing commands or notifications to the router monitoring data device B, for example, Web API 61 and Web Notice, wherein Web API 61 provides an interface with the database server 5. As shown in FIG. 6, the function main tags of the user interface 60 include "home page", "account permission management", "abnormal data characteristics management", "data inquiry", and "emergency notification". Furthermore, the function sub-tags of "home page" include "instrument panel of availability" and "system login"; the function sub-tags of "account permission management" include "account management", "role management", "function management", "permission management", and "operation record inquiry".

The function sub-tags of "abnormal data characteristics management" include "CMS abnormal content keyword management", "VD CMS eTag AVI TC no-active returning threshold value management", "eTag AVI time-period detectable threshold value management" and "whitelist management"; the function sub-tags of "data inquiry" include "roadway equipment data inquiry" "roadway equipment availability inquiry" and "emergency notification record inquiry"; the function sub-tags of "emergency notification" include "emergency notification management" and "equipment IPC blackout/reboot". Through the user interface 60, administrators can easily decode, inquire, record, notify, and manage various data returned by the roadway equipment 9 located in the equipment side; at the same time, the aforementioned user interface also provides functions for issuing commands to the plurality of router monitoring data device B; issues commands of blackout/reboot remotely to devices of the equipment side.

Therefore, the present invention, in conjunction with the router monitoring data device B that replaces the conventional device of the equipment side, provides an optimal solution for the cloud-based roadway equipment management platform to monitor the cloud servers and the roadway equipment 9. The cloud-based roadway equipment management platform A of the present invention can monitor, record, notify conditions of the roadway equipment 9 of the equipment side, prevent hacker invasion in order to enhance the availability of devices of the equipment side, and help the traffic control center side to clarify responsibility of equipment vendors. Therefore, abnormal conditions of the roadway equipment 9 monitored by the cloud-based roadway equipment management platform of the present invention, as shown in FIG. 3, include, but not limited to, "CMS inconsistency", "off CMS-specification", "detection value too small", "no-active reporting", and "off protocol-specification".

Figure 7:
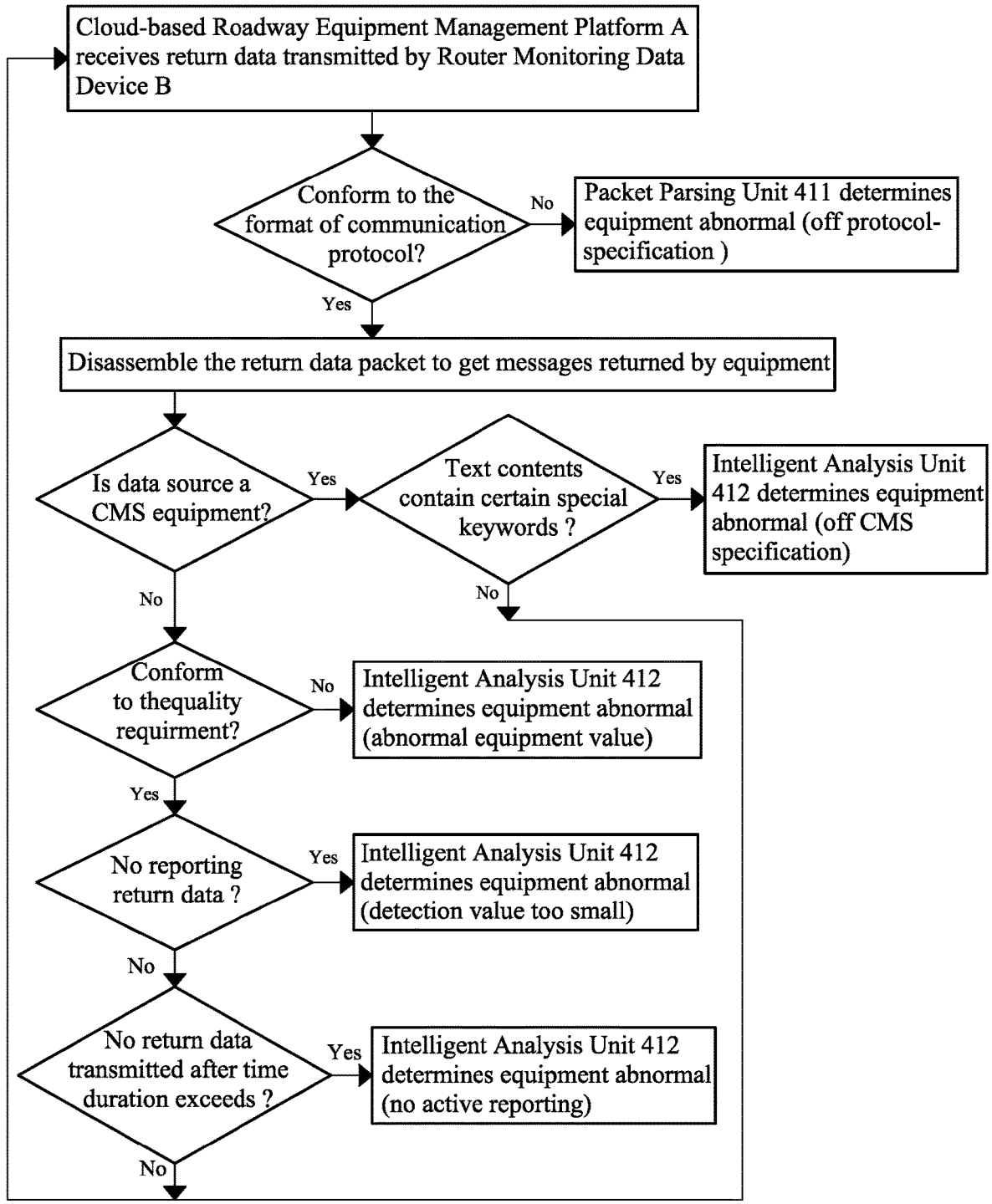
FIG. 7 is a flow chart of the back end operation to monitor return traffic data transmitted from the equipment side of the cloud-based roadway equipment management platform of the present invention.

The cloud-based roadway equipment management platform A of the present invention receives the return data transmitted through the plurality of router monitoring data devices B; the packet parsing unit 411 of the data analysis program 41, as shown in FIG. 7, first will quickly match the specification (such as packet header) of the received packets using regular expression technology. If there is a match in the specification of the communication protocol, then the packet is disassembled for the roadway equipment 9 information to be retrieved; next, the intelligent analysis unit 412 analyzes data of the roadway equipment 9 specifically. If there is not a match, it is determined as "off protocol-specification". Next, the intelligent analysis unit 412 determines whether the roadway equipment 9 that generates data is a CMS equipment or not; if the data is from a CMS equipment, the intelligent analysis unit then will determine whether the text contents have consistency or contain certain special keywords; if special keywords exist, it is determined as "off CMS-specification", an abnormal condition. The cloud-based roadway equipment management platform A usually will be pre-stored with text contents of CMS equipment to be announced by the traffic control center side 7 for better judging the consistency of text contents of CMS equipment. If the intelligent analysis unit 412 judges that the roadway equipment 9 which generates data is not a CMS equipment, then the intelligent analysis unit 412 will determine separately whether the abnormal condition of the roadway equipment 9 is "abnormal equipment value", "detection value too small" and "no-active reporting".

Taking VD equipment as an example, after the packet parsing unit 411 disassembles the packet, data of the VD equipment are retrieved that contain data of current traffic volume, vehicle speed, etc. On the other hand, the intelligent analysis unit 412 analyzes whether VD equipment data conform the quality requirement. If the quality requirement is not met, then the equipment is abnormal (abnormal VD value).

After the packet parsing unit 411 disassembles the packet, the VD equipment data is accessed. When the equipment is analyzed, if the intelligent analysis unit 412 determines that the data does meet the requirement of one data record per minute and the lost time exceeds the quality duration time specified by the administrator, it is determined that the equipment is abnormal ("detection value too small").

For example, in general, when the traffic signal turns to a different color (green to yellow, yellow to red, red to green), the equipment is set to actively transmit return data. The router monitoring data device B will actively transmit such data to the cloud-based roadway equipment management platform A. When the aforementioned data is received, the intelligent analysis unit 412 determines the lost time (for example, the cycle of the traffic signal is 120 seconds; a cycle length refers to a complete sequence of signal phases of green to yellow, yellow to red, red to green). In addition, when the lost time exceeds 120 seconds and no return data actively transmitted is received, it is determined as an abnormal equipment (no-active reporting).

Figure 8:
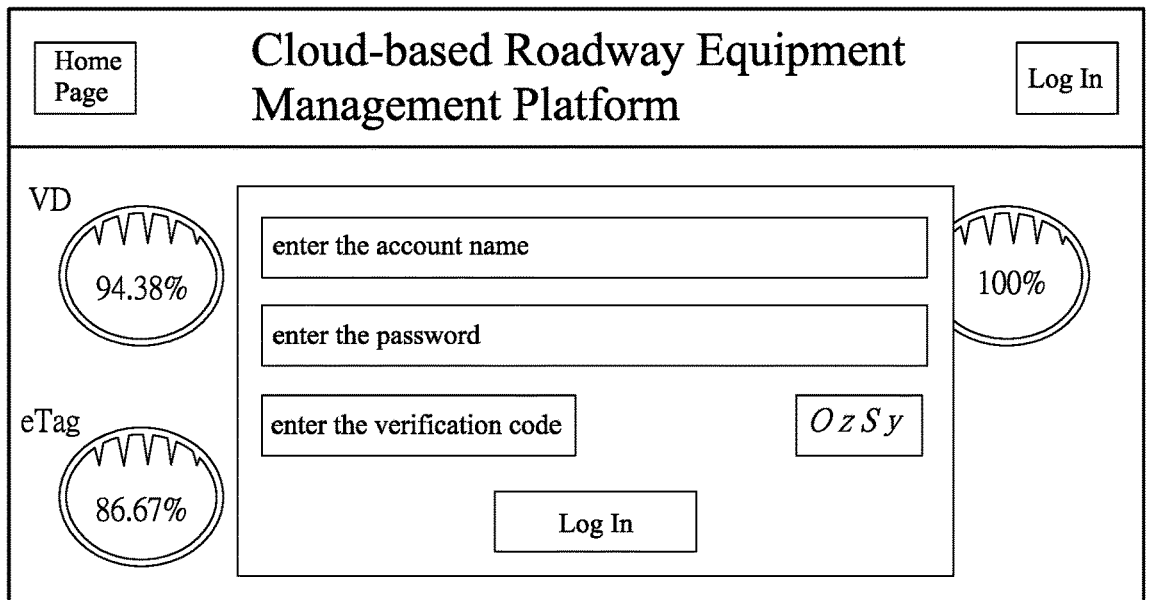
FIG. 8 is a schematic diagram of the home page and login page of the user interface of the present invention.

Furthermore, the present invention provides an optimal solutions for the administrator user interface of the cloud-based roadway equipment management platform, wherein the administrator user interface 60 allows administrators to easily monitor and manage the roadway equipment 9 of the equipment side. The home page window 601, as shown in FIG. 8, mainly uses an instrument panel of availability 603 as the screen background; within the screen background, there are 5 function main tags 602 of "home page", "account permission management", "abnormal data characteristics management", "data inquiry", and "emergency notification" thereon, wherein "home page" mainly provides administrators to log in and log out; the "home page" window 601 uses the instrument panel of availability 603 as the screen background to provide administrators with information of the availability of the roadway equipment 9 at any time. "Account permission management" allows administrators to manage the login account and password, and permission rights. "Abnormal data characteristics management" provides functions of monitoring and managing the state of roadway equipment 9 at the time, and updating whitelists of the router monitoring data device B. "Data inquiry" provides the inquiry function of historical records of the roadway equipment 9. "Emergency notification" notifies and dispatches equipment vendors of the roadway equipment 9 to maintain and operate the problematic equipment, and controls the blackout/reboot of the roadway equipment 9 remotely.

Each function main tag 602 has a plurality of specified function sub-tags 604 thereunder (as shown in FIG. 6). The user interface 60 has many function sub-tags 604. Therefore, important sub-functions 604 that relate to monitoring the roadway equipment 9 are used as examples for demonstrating of the present invention.

Figure 9:
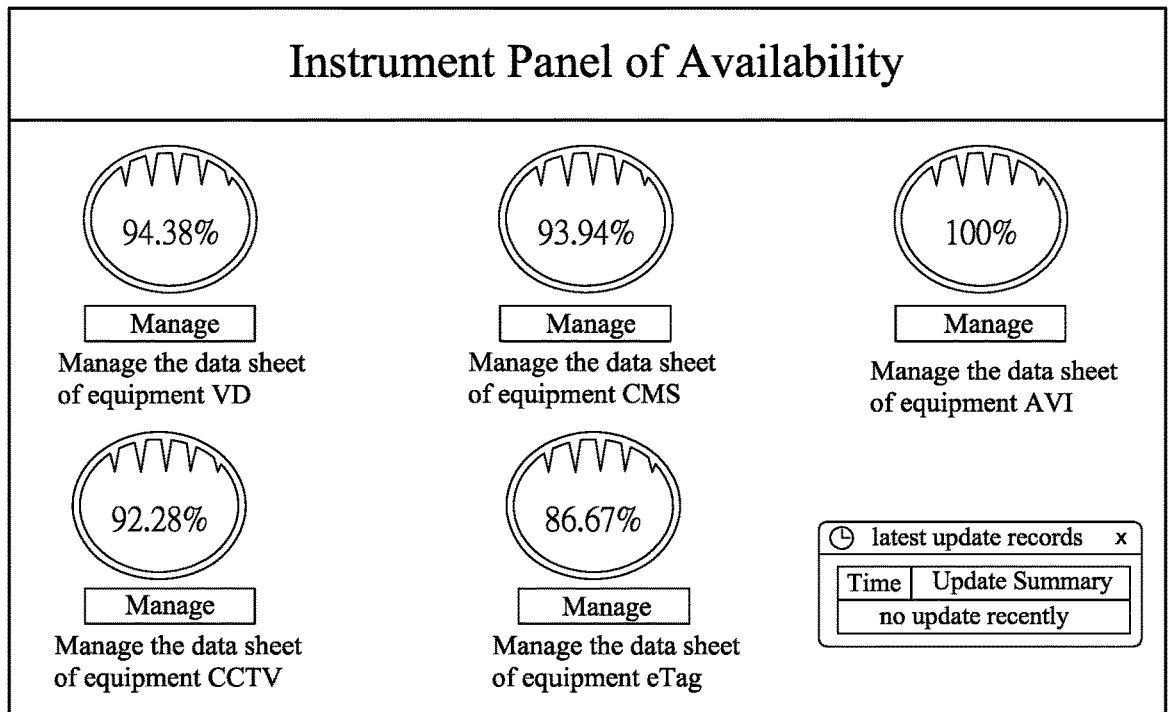
FIG. 9 is a schematic diagram of the display window of the instrument panel of availability of the roadway equipment of the present invention.

The aforementioned instrument panel of availability 603 of the home page window 601, as shown in FIG. 9, comprises a plurality of dynamic graphical blocks of availability to display availabilities of VD, CMS, AVI, CCTV, eTag separately at the time in real time. Administrators are able to view clearly. The control item "Manage" is located below each of the plurality of dynamic graphical blocks; by selecting the icon of the control item "Manage", a display window 605 will pop up, as shown in FIG. 10. The display window 605 will present the geographical location, equipment number, IP address, communication port, GPS latitude and longitude, and whether the equipment has abnormal conditions at the time. A control item of "Reboot equipment" can be added to the display window 605. If the condition of the equipment is abnormal, select the control item "Reboot equipment" to execute the blackout/reboot command on the abnormal equipment immediately.

For the function main tag 602 of "abnormal data characteristics management", please refer to FIG. 11, that is, a window 606 of the "CMS abnormal content keyword management" embodiment. When the text contents of the existing CMS equipment contain such keywords, the CMS equipment will be determined as an abnormal equipment by the data analysis program 41. The administrator also can specify and edit keywords of the CMS abnormal content keywords. FIG. 12 demonstrates a window 607 of the "VD CMS eTag AVI TC no-active returning threshold value management" embodiment, which manages the return threshold values of the roadway equipment 9, especially including VD, CMS, eTag, AVI, TC. Administrators can specify and edit values in reference to the specifications thereof; the data analysis program 41 will detect whether the detected value of the equipment is too small according to such threshold values.

Please refer to FIG. 13 for a window 608 of the "eTag AVI time-period detectable threshold management" embodiment, which manages the time-period detectable threshold values of the roadway equipment 9, especially including eTag, AVI. Administrators can specify and edit values in reference to the specifications thereof; the data analysis program 41 will detect whether the detected value of the equipment is too small according to such threshold values. Please refer to FIG. 14 for a window 609 of the "whitelist management" embodiment, which manages, edits, and daily updates the whitelists of the router monitoring data device B according to the content lists of the legal IP address or MAC address, wherein the daily updating operation is performed by the Web API 61.

For the function main tag 602 of "data inquiry", please refer to FIG. 15. This is a window 610 of the "equipment data inquiry" embodiment that performs inquiry of historical data of the roadway equipment 9, that is, inquiry of historical records of the state of equipment availability, emergency notification, and equipment blackout/reboot.

For the function main tag 602 of "emergency notification" please refer to FIG. 16. This is a window 611 of the "emergency notification management" embodiment that allows administrators to specify contents and recipients of the emergency notification. The general recipients are equipment vendors or administrators of roadway equipment 9; the contents of notification are data of abnormal states and abnormal communication of the roadway equipment 9. Please refer to FIG. 17 for a window 612 of the "equipment IPC blackout/reboot" embodiment, wherein the window 612 issues the equipment blackout/reboot command designated to those roadway equipment 9 with no-active reporting. Especially, the aforementioned home page windows 601 and windows 606 to 612 are set with a floating notification window 613, wherein the floating notification window 613 executes push notifications that must be sent recently.

What is claimed is:

1. A cloud-based roadway equipment management platform, which is used together with a plurality of router monitoring data devices, comprising a communication server, a logical server, and a web server that use a custom-made communication protocol to maintain networking among servers, wherein
   the plurality of router monitoring data devices provide a network connection for roadway equipment of an equipment side through a wired network or a wireless network, and return data of the roadway equipment back to a traffic control center side based on contents of a safety checklist of a built-in electronic device identification and a network address;
   the communication server comprises a communication receiving program in order to receive the return data of the roadway equipment transmitted by the plurality of router monitoring data devices, and then compress the return data of the roadway equipment into compressed packets prior to being transmitted to the logical server;
   the logical server uncompresses the compressed packets transmitted by the communication server and further comprises a data analysis program that analyzes the uncompressed packets and transmits analysis results to a database server for storage; and
   the web server comprises a user interface for accessing information stored in the database server and provides functions for issuing commands to the plurality of router monitoring data devices.

2. The cloud-based roadway equipment management platform as claimed in claim 1, wherein each of the plurality of router monitoring data devices further comprises a communication module, a receiver module, a whitelist database, a control module, and a judgment module, wherein the control module is electrically connected with the judgment module and is further connected to a corresponding relay outside each of the router monitoring data device in order to provide function of initiating blackout/reboot of the roadway equipment of the equipment side.

3. The cloud-based roadway equipment management platform as claimed in claim 2, wherein the judgment module determines commands and conditions of abnormal communication of the equipment side that must be recorded; comparison is performed based on the safety checklist of the built-in electronic device identification and the network address retrieved from the whitelist database; regardless of whether a match is found or not, information of operational actions of the roadway equipment is transmitted through the communication module to a communication receiving program of a designated communication port.

4. The cloud-based roadway equipment management platform as claimed in claim 3, wherein the conditions of abnormal communication of the equipment side refer to line disconnection of the equipment side, line disconnection of routers, abnormal IP address addition, abnormal MAC address addition or/and abnormal communication port addition; the safety checklist of the built-in electronic device identification and the network address is a list of communication ports and Mac addresses of IP addresses available for the roadway equipment to plug in.

5. The cloud-based roadway equipment management platform as claimed in claim 1, wherein the data analysis program installed in the logical server comprises a packet parsing unit and an intelligent analysis unit; the packet parsing unit uses regular expression technology to compare a specification of a received packet; if the specification of the received packet matches a specification of the communication protocol, then the received packet is disassembled to obtain the return data of the roadway equipment, and then the intelligent analysis unit analyzes the return data of the roadway equipment; if the specification of the received packet does not match the specification of the communication protocol, the received packet is determined as an off protocol-specification.

6. The cloud-based roadway equipment management platform as claimed in claim 5, wherein the intelligent analysis unit determines whether the roadway equipment that generates the return data is a changeable message sign equipment or not; if the return data is from the changeable message sign equipment, the intelligent analysis unit then will determine whether text contents contain certain special keywords; if the certain special keywords exist, the return data is determined to be an off changeable message sign-specification abnormal condition; if the return data is not from the changeable message sign equipment, then the intelligent analysis unit will separately determine conditions of abnormal equipment value, detection value too small and no-active reporting of the roadway equipment.

7. The cloud-based roadway equipment management platform as claimed in claim 1, wherein a queue server, installed between the communication server and the logical server, receives the compressed packets transmitted by the communication server and sets the compressed packets in a queue based on a time-stamp to be processed by the logical server in order to moderate workload of a vast amount of return data.

* * * * *